United States Patent [19]
Smith et al.

[11] Patent Number: 5,622,124
[45] Date of Patent: Apr. 22, 1997

[54] COULTER FERTILIZER TINE

[75] Inventors: David R. Smith, Fort Jennings, Ohio; Loren G. Arnold, Tucson, Ariz.; Kenneth L. Bellman, Ottawa, Ohio

[73] Assignee: Unverferth Manufacturing Co., Inc., Kalida, Ohio

[21] Appl. No.: 600,180

[22] Filed: Feb. 12, 1996

[51] Int. Cl.⁶ .................................................. A01C 15/00
[52] U.S. Cl. ............................................ 111/121; 111/120
[58] Field of Search ................................ 111/52, 66, 121, 111/120, 118, 122, 123, 124, 125, 126, 139, 186; 172/49.5, 47, 112, 117, 166

[56] References Cited

U.S. PATENT DOCUMENTS

| | | |
|---|---|---|
| Re. 25,307 | 12/1962 | Johnston . |
| Re. 27,295 | 2/1972 | Pechacek . |
| 458,232 | 8/1891 | Kephart . |
| 559,042 | 4/1896 | Potter . |
| 2,501,555 | 3/1950 | White . |
| 2,580,145 | 12/1951 | White . |
| 2,701,513 | 5/1955 | Hyland et al. . |
| 2,805,613 | 9/1957 | Siems . |
| 2,906,353 | 9/1959 | Rogers . |
| 2,912,944 | 11/1959 | Snow et al. . |
| 3,017,057 | 1/1962 | Reed . |
| 3,310,239 | 3/1967 | Hesp et al. . |
| 3,368,334 | 2/1968 | West . |
| 3,515,349 | 6/1970 | Mecklin et al. . |
| 3,588,139 | 6/1971 | Bayne . |
| 4,048,929 | 9/1977 | Zumbahlen . |
| 4,149,475 | 4/1979 | Bailey et al. . |
| 4,205,615 | 6/1980 | Jacobson . |
| 4,244,522 | 1/1981 | Hartwig . |
| 4,304,306 | 12/1981 | Maust, Jr. et al. . |
| 4,574,715 | 3/1986 | Dietrich, Sr. et al. . |
| 4,577,568 | 3/1986 | Netsch . |
| 4,624,193 | 11/1986 | Johnston . |
| 4,656,957 | 4/1987 | Williamson et al. . |
| 4,745,978 | 5/1988 | Williamson . |
| 4,796,550 | 1/1989 | Van Natta et al. . |
| 4,987,841 | 1/1991 | Rawson et al. .......................... 111/121 |
| 4,998,488 | 3/1991 | Hansson .............................. 111/121 X |
| 5,027,724 | 7/1991 | Ptacek et al. ........................... 111/121 |
| 5,139,200 | 8/1992 | Greimann et al. . |
| 5,309,852 | 5/1994 | Zimmerman ............................ 111/121 |
| 5,370,068 | 12/1994 | Rawson et al. ......................... 111/121 |
| 5,467,723 | 11/1995 | McIvor-Dean et al. ............ 111/121 X |
| 5,473,999 | 12/1995 | Rawson et al. . |

FOREIGN PATENT DOCUMENTS

| | | |
|---|---|---|
| 1454990 | 10/1966 | France . |
| 2324216 | 5/1977 | France . |

*Primary Examiner*—Terry Lee Melius
*Assistant Examiner*—Robert Pezzuto
*Attorney, Agent, or Firm*—Rothwell, Figg, Ernst & Kurz

[57] ABSTRACT

A coulter fertilizer applicator for use with a frame adapted to be moved over soil to be tilled and fertilized includes a linkage arm connected to the frame, and a coulter wheel secured to the linkage arm to form a seedbed in the soil. Included is a fertilizer tine formed of a single spring element having a forward end secured to the linkage arm. The single spring element further includes a free end opposite the forward end which is in the plane of rotation of the coulter wheel and adjacent the top surface of the soil. A fertilizer dispenser is attached to the single spring element adjacent the free end for applying fertilizer within the seedbed.

21 Claims, 2 Drawing Sheets

1
COULTER FERTILIZER TINE

BACKGROUND OF THE INVENTION

1. Field of the Invention

The present invention relates to the field of devices for applying fertilizer to soil tilled by a coulter wheel.

2. Description of the Background Art

It is advantageous for a farmer to keep the number of passes over a field to a minimum during farming operations. This is facilitated by use of a coulter cart apparatus, which is attachable to planters or drills to enable a farmer to make fewer passes over the soil by farming machinery during seedbed preparation.

There are several advantages resulting from the use of a coulter cart apparatus. Since fewer machinery passes are needed, the soil is less compacted and presents a better seedbed, thus promoting plant growth. More importantly, fewer passes over the field saves time and fuel costs.

A coulter cart apparatus with fertilizer dispensing allows a farm operator to cultivate, fertilize and plant in one pass.

Several devices are known which provide such advantages, including the previous device disclosed in commonly-owned U.S. Pat. No. 5,370,068, incorporated herein by reference. A prior art device generally in accordance with this patent is shown in present FIG. 3.

The prior art device is an apparatus for preparing a seedbed which also provides fertilizer to a seedbed. The fertilizer preferably is in liquid form and injected into the soil.

The prior art device may suitably comprise the elements including a generally H-shaped frame or main frame, means for securing the apparatus to a motive force, a plurality of coulter wheels and respective support means or coulter linkage arms, means for applying fertilizer, means for linking the apparatus with a planting apparatus, elevating means for adjusting the depth of the coulter wheels, and means for storing fertilizer mounted on said apparatus.

The coulter wheels typically are spaced equidistantly along the main frame in three rows. The coulter wheels are adjustable horizontally and vertically along the main frame.

The fertilizer injectors are provided to the rear of the last row of coulter wheels. The injectors are mounted upon fixed arms with spring members which permit the injectors to flex with the terrain the apparatus is traversing. Such structure prevents clogging of the injector nozzles.

As noted above, the prior art device shown in FIG. 3 is part of a seedbed preparation apparatus for a device generally in accordance with previously-mentioned U.S. Pat. No. 5,370,068.

The prior art device includes a coulter wheel 50 rotationally mounted on a linkage arm assembly 51 including a support post 52 and linkage arm 53. Also included is a fertilizer applicator attachment arm 54. The linkage arm 53 extends substantially downwardly and rearward from the lower end of support post 52. The support post 52 is substantially vertically attached to the main support member of frame 12.

The device described in U.S. Pat. No. 5,370,068 includes fertilizer storing means comprised of a large cylindrical tank which is constructed of material which is resistant to most chemical agents. The tank is secured to the cart apparatus as is known in the art, with bands or chain or other equivalent means.

The fertilizer storing means is connected to a plurality of tubes for conveying fertilizer via a pump. The pump is operated off of a power take off from a tire of the apparatus, or other suitable means.

The support post 52 is secured at its upper end to frame 12 by adjustable clamp member 63. The clamp means utilizes elongate bolt members for tightening opposing plate member 55 against frame 12.

The prior art device includes a fertilizer applicator attachment arm 54 discussed above, which is rigidly connected to linkage arm 53 and supports a spring member 56. The spring member 56 includes a coil head 57 secured to arm 54. Extending from and integral with the head 57 is a tail portion 58 of a length sufficient to contact the ground. Secured to the tail portion is fertilizer injector nozzle 59. The nozzle 59 is interconnected with robe 60. The tail portion flexes with the contour of the terrain the apparatus is passing over.

There remains a need in the art for improvements in coulter fertilizer delivery devices.

SUMMARY OF THE INVENTION

In accordance with the present invention, a fertilizer tine formed of a single spring element is secured to a linkage arm of a coulter wheel apparatus. The fertilizer tine includes a forward end secured to the linkage arm. The fertilizer tine further includes a free end opposite the forward end, which is substantially in the plane of rotation of the coulter wheel, adjacent the surface of the soil. A fertilizer dispenser is attached to the single spring element adjacent the free end for applying fertilizer within a seedbed in the soil.

DETAILED DESCRIPTION OF THE PREFERRED EMBODIMENT

Figure 3:
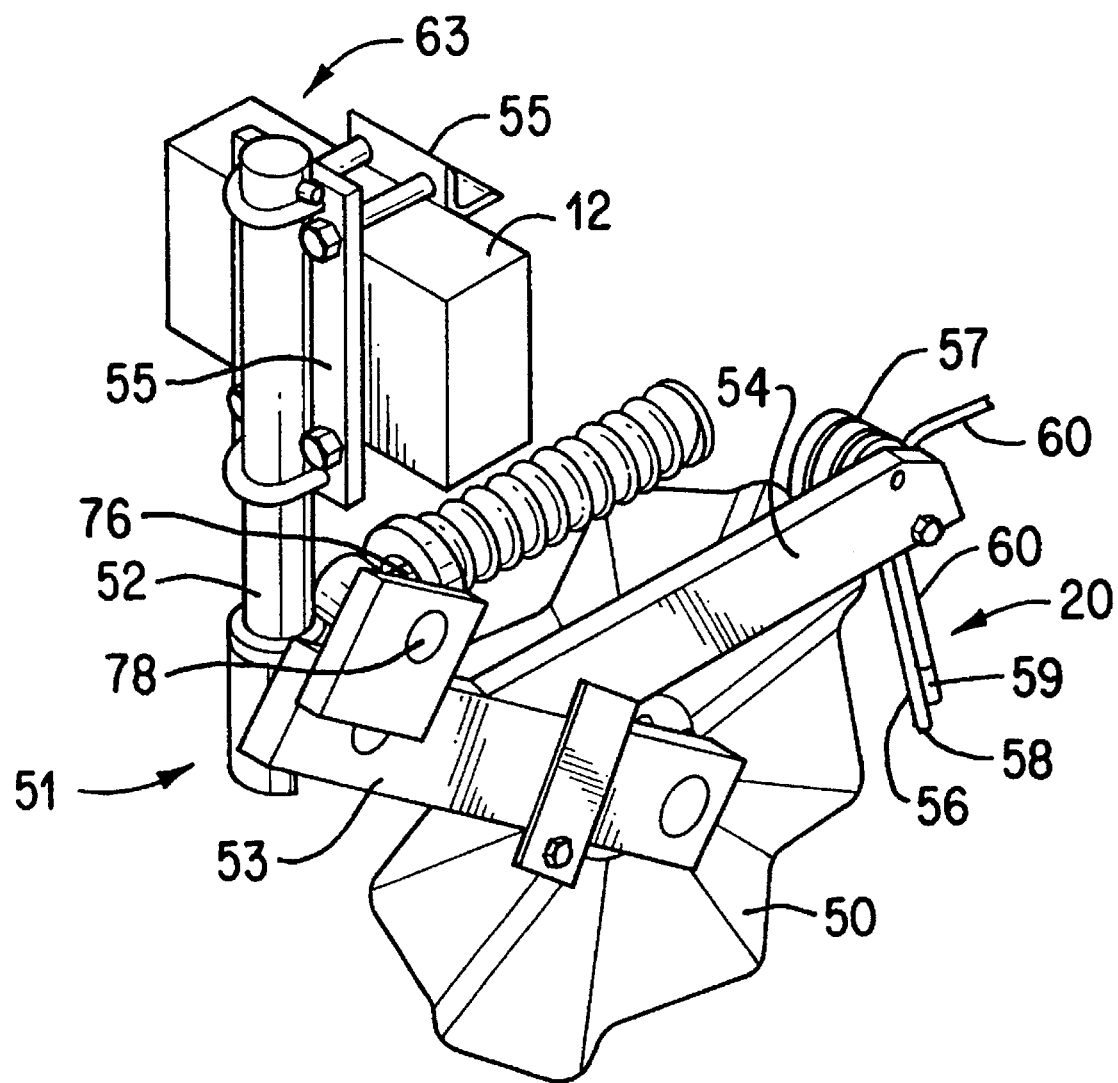
FIG. 3 is a perspective view, with portions broken away, of a prior art coulter wheel fertilizer apparatus.

The present invention is a coulter fertilizer applicator unit for use with a frame adapted to be moved over soil to be tilled and fertilized, as described in previously-mentioned U.S. Pat. No. 5,370,068. The device includes a support post 52 mounted on a frame member 12, as shown in FIG. 3.

A coulter wheel 50 is flexibly mounted on support post 52 for tilling engagement with soil over which the frame is moved to form a seedbed in the soil. The coulter wheel can be fluted as shown in FIG. 3, or a disk.

Figure 1:
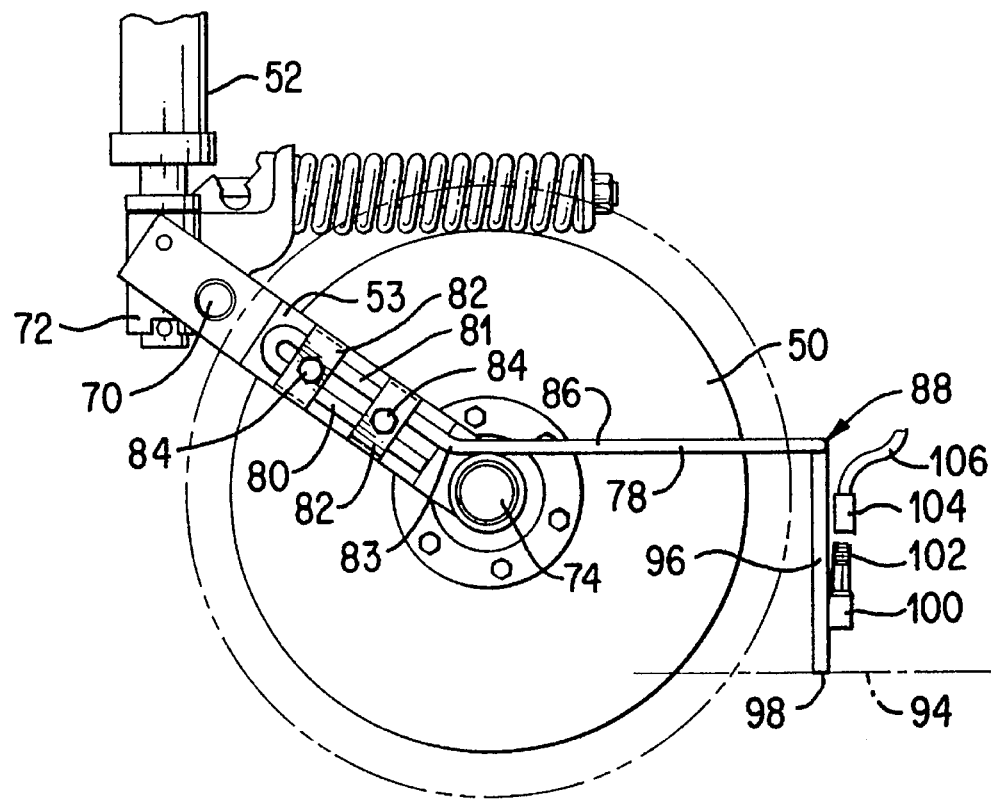
FIG. 1 is a side elevational view, somewhat schematic, showing a fertilizer tine formed of a single spring element mounted to a linkage arm of a coulter wheel assembly in accordance with the present invention.

As shown in FIG. 1, a linkage arm 53 is flexibly and rotatably mounted on support post 52 by means including spindle 70 engaged with swivel casting 72.

Figure 2:
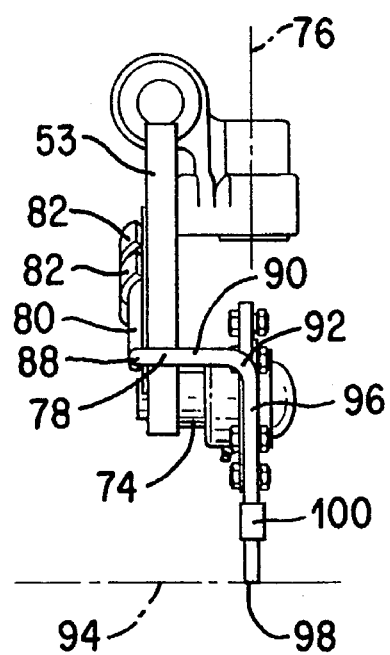
FIG. 2 is an end elevational view, with portions including the coulter wheel, removed for clarity, showing the fertilizer tine of the present invention.

As shown in FIG. 1, coulter wheel 50 is mounted on the side of linkage arm 53 along an axle 74, also shown in FIG. 2 with the coulter wheel removed for clarity. Further shown in FIG. 2 is the plane of rotation (represented by line 76) of the coulter wheel 50 which is shown in FIG. 1.

As can be seen best in FIG. 1, the fertilizer tine of the present invention is formed of a single spring element 78.

The single spring element 78 of the inventive fertilizer tine includes a forward end 80 which is secured to the linkage arm 53 by means of clamps 82 and bolts 84. As can best be seen in FIG. 2, forward end 80 of spring element 78 of the inventive fertilizer tine is mounted on linkage arm 53 out of the plane of rotation 76 of the coulter wheel.

Spring element 78 includes a rearwardly-extending portion 86 having a rear end 88 disposed rearwardly and beyond coulter wheel 50, as shown in FIG. 1. As can be seen in FIG. 2, rear end 88 is out of the plane of rotation 76 of the coulter wheel.

As best seen in FIG. 2, spring element 78 has a sidewardly-extending portion 90 which extends from the rear end 88 to a point 92 substantially in the plane of rotation 76 of the coulter wheel.

As can be seen in FIGS. 1 and 2, the rearwardly-extending portion 86 and sidewardly-extending portion 90 of spring element 78 are substantially linear and parallel with a top surface (represented by dashed line 94) of the soil. A bend at point 88 in spring element 78 connects the sidewardly-extending portion 90 with the rearwardly-extending portion 86.

Spring element 78 further includes a downwardly-extending portion 96 which extends downwardly substantially in the plane of rotation 76 of the coulter wheel from the point 92 of the sidewardly-extending portion 90 toward the surface 94 of the soil. Portion 96 terminates at a free end 98 which terminates substantially adjacent the top surface of the soil and preferably contacts the soil. In particularly preferred embodiments, the free end 98 engages the soil in a coulter wheel-trailing, non-tilling manner, with spring element 78 flexing with the contour of the soil over which it is passing. The downwardly-extending portion 96 of spring element 78 is substantially linear, and is substantially parallel with the plane of rotation 76 of the coulter wheel and perpendicular with the top surface 94 of the soil.

As can be seen in FIG. 2, a bend at point 92 in spring element 78 connects the downwardly-extending portion 96 with the sidewardly-extending portion 90 thereof.

A fertilizer dispenser such as nozzle 100 is attached to portion 96 of spring element 78 by any suitable means, such as by welding, adjacent the free end 98, for applying fertilizer within the seedbed being formed in the soil. As shown in FIG. 1, nozzle 100 includes a threaded end 102 for attachment to connector 104 at the end of a hose 106 leading to a fertilizer tank (not shown) as described in U.S. Pat. No. 5,370,068.

Nozzle 100 is spaced upwardly and away from the bottom of the spring free end 98. Nozzle 100 is maintained above the surface 94 of the soil to prevent plugging of nozzle 100.

In the embodiment shown, the forward end 80 of spring element 78 is comprised of a U-shaped portion by which the forward end 80 is secured to the linking arm 53. As can be seen in FIG. 1, the rearwardly-extending portion 86 is connected to one leg 81 of the U-shaped portion at a bend 83 in spring element 78.

As shown in FIG. 1, the fertilizer applicator of the present invention is adjustable along the legs of the U-shaped portion when clamps 82 are loosened so as to change the position of the fertilizer tine with respect to the top surface 94 of the soil and coulter wheel 50.

The coulter fertilizer tine of the present invention has several significant advantages over the prior art fertilizer applicator shown in FIG. 3. It is readily apparent that the present invention, formed of a single spring element, has significantly fewer parts than the prior art fertilizer applicator shown in FIG. 3. The present invention thus is more economical to manufacture, and is easier to service and replace. The present invention takes up less room on the cultivator, is easier to manufacture and is much easier to set in the right position than the prior art device. Moreover, the present invention is less easily damaged than the prior art device which has attachment arm 54 rigidly connected to the coulter linkage arm 53.

Since many modifications, variations and changes in detail may be made to the described embodiment, it is intended that all matter in the foregoing description and shown in the accompanying drawings be interpreted as illustrative, and not in a limiting sense.

We claim:

1. A coulter fertilizer applicator for use with a frame adapted to be moved over a top surface of soil to be tilled and fertilized, comprising:

a support post connected to a farm apparatus frame;

a linkage arm connected to said support post;

a coulter wheel having an axle mounted on said linkage arm, said coulter wheel for tilling engagement with soil over which the frame is moved to form a seedbed therein, the coulter wheel having a plane of rotation;

a fertilizer tine formed of a single spring element, said single spring element including a forward end mounted directly on said linkage arm between said coulter wheel and said support post and forwardly of said axle of said coulter wheel;

said single spring element including a free end disposed rearwardly and beyond said coulter wheel, said free end being disposed in said plane of rotation of said coulter wheel, said free end terminating substantially adjacent the top surface of said soil; and a fertilizer dispenser attached to said single spring element substantially adjacent said free end of said spring element for applying fertilizer to the seedbed.

2. The applicator of claim 1, wherein said coulter wheel is mounted on a side of said linkage arm, said forward end of said single spring element being secured to said linkage arm out of said plane of rotation of said coulter wheel, said single spring element including a rearwardly-extending portion having a rear end out of said plane of rotation of said coulter wheel, said rear end disposed rearwardly and beyond said coulter wheel, said single spring element having a sidewardly-extending portion which extends from said rear end to a point substantially in said plane of rotation of said coulter wheel, said single spring element further including a downwardly-extending portion which extends substantially in said plane of rotation downwardly from said sidewardly-extending portion toward said soil to said free end.

3. The applicator of claim 2, wherein said rearwardly-extending portion is substantially linear.

4. The applicator of claim 2, wherein said sidewardly-extending portion is substantially linear.

5. The applicator of claim 2, wherein said forward end of said single spring element is comprised of a U-shaped portion by which said forward end is mounted on said linking arm.

6. The applicator of claim 5, wherein said rearwardly-extending portion is connected to a leg of said U-shaped portion.

7. The applicator of claim 5, wherein said U-shaped portion is mounted on said linking arm by at least one clamp.

8. The applicator of claim 5, wherein the position of said fertilizer tine is adjustable with respect to said top surface of said soil and said coulter wheel along legs of said U-shaped portion.

9. The applicator of claim 3, wherein said rearwardly-extending portion is substantially parallel with the top surface of said soil.

10. The applicator of claim 4, wherein said sidewardly-extending portion is substantially parallel with the top surface of said soil.

11. The applicator of claim 2, wherein a bend in said single spring element connects said rearwardly-extending portion with said forward end.

12. The applicator of claim 2, wherein a bend in said single spring element connects said sidewardly-extending portion with said rearwardly-extending portion.

13. The applicator of claim 2, wherein a bend in said single spring element connects said downwardly-extending portion with said sidewardly-extending portion.

14. The applicator of claim 2, wherein said downwardly-extending portion is substantially linear.

15. The applicator of claim 2, wherein said downwardly-extending portion is substantially perpendicular with the top surface of said soil.

16. The applicator of claim 1, wherein said free end engages said soil in a trailing, non-tilling manner.

17. The applicator of claim 1, wherein said single spring element flexes with contour of said soil over which said single spring element is passing.

18. The applicator of claim 1, wherein said fertilizer dispenser comprises a nozzle secured to and spaced upwardly and away from said free end.

19. The applicator of claim 18, wherein said nozzle is maintained above said surface of said soil to prevent plugging of said nozzle with said soil.

20. The applicator of claim 2, wherein said linkage arm is connected to said frame by a support post mounted on said frame, and wherein said linkage arm is flexibly mounted on said support post.

21. A coulter fertilizer applicator for use with a frame adapted to be moved over a top surface of soil to be tilled and fertilized, comprising:

a support post connected to a farm apparatus frame;

a linkage arm connected to said support post;

a coulter wheel having an axle mounted on said linkage arm, said coulter wheel for tilling engagement with soil over which the frame is moved to form a seedbed therein, the coulter wheel having a plane of rotation;

a fertilizer tine formed of a single spring element, said single spring element including a forward end mounted directly on said linkage arm between the coulter wheel axle and said support post;

said single spring element including a free end disposed rearwardly and beyond said coulter wheel, said free end being disposed in said plane of rotation of said coulter wheel, said tree end terminating substantially adjacent the top surface of said soil; and a fertilizer dispenser attached to said single spring element substantially adjacent said free end of said spring element for applying fertilizer to the seedbed.

* * * * *